(No Model.)
J. S. WECKMAN.
HARROW.
No. 589,517. Patented Sept. 7, 1897.
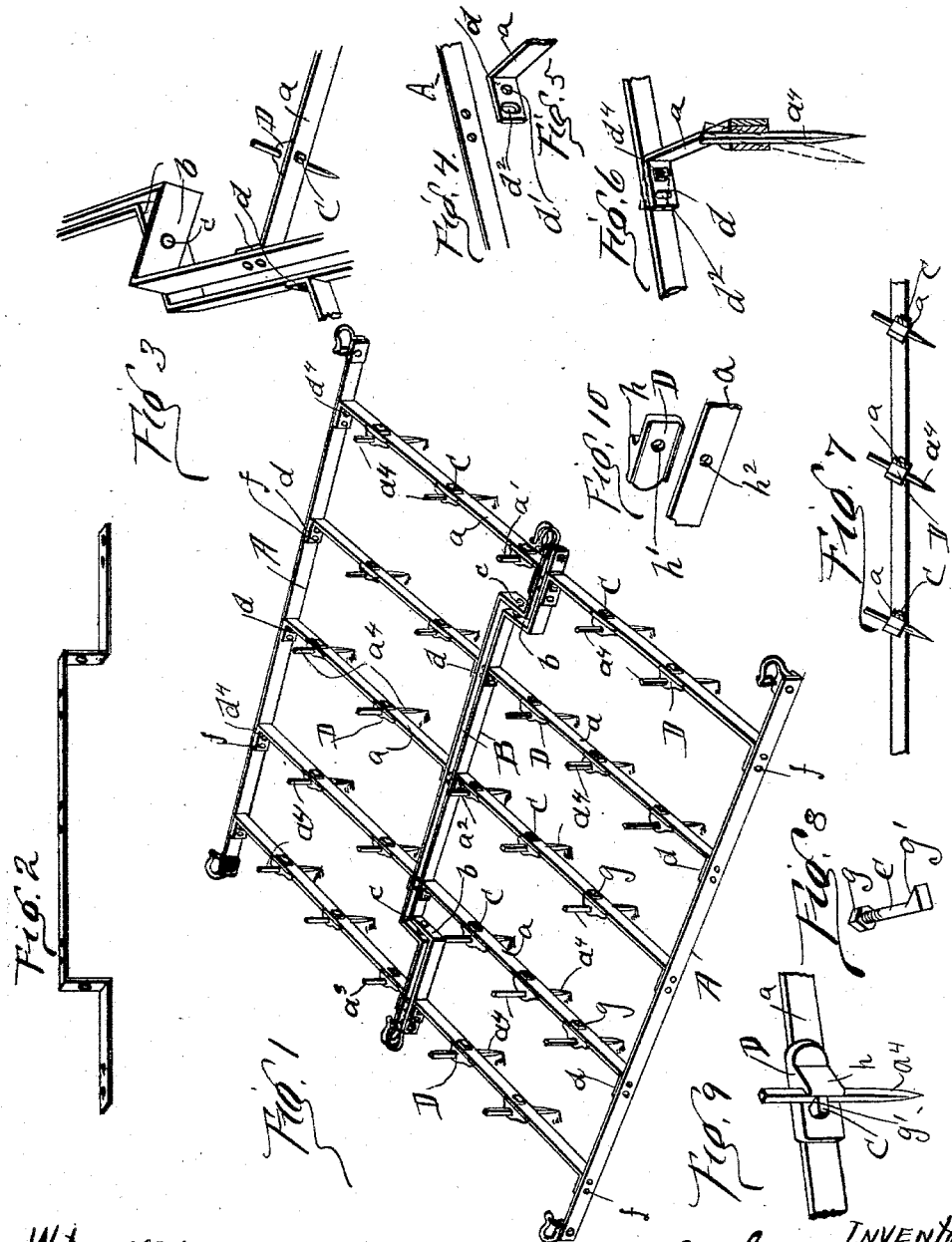
Witnesses:
Inventor:
John S. Weckman
By Fred W. Bond
Atty

UNITED STATES PATENT OFFICE.

JOHN S. WECKMAN, OF CANTON, OHIO.

HARROW.

SPECIFICATION forming part of Letters Patent No. 589,517, dated September 7, 1897.

Application filed December 21, 1896. Serial No. 616,413. (No model.)

*To all whom it may concern:*

Be it known that I, JOHN S. WECKMAN, a citizen of the United States, residing at Canton, in the county of Stark and State of Ohio, have invented certain new and useful Improvements in Harrows; and I do hereby declare that the following is a full, clear, and exact description of the same, reference being had to the annexed drawings, making a part of this specification, and to the letters of reference marked thereon, in which—

Figure 1 is a perspective view of the harrow. Fig. 2 is a detached view of one of the center side bars. Fig. 3 is a view showing portions of the center side bars hinged together and tilted at an angle to each other. Fig. 4 is a detached view showing a portion of one of the outer side views. Fig. 5 is a detached view showing a portion of one of the harrow teeth-bars and its attaching end. Fig. 6 is a view showing one of the teeth-bars properly attached to a side bar and illustrating a tooth properly located. Fig. 7 is a sectional view showing the teeth-bars and their teeth tilted to produce a floating harrow. Fig. 8 is a detached view of one of the teeth-clamps. Fig. 9 is a view showing a portion of one of the teeth-bars and illustrating a tooth properly connected thereto. Fig. 10 is a perspective view of one of the teeth-clamps.

The present invention has relation to harrows; and it consists in the different parts and combination of parts hereinafter described, and particularly pointed out in the claims.

Similar letters of reference indicate corresponding parts in all the figures of the drawings.

In the accompanying drawings, A represents the outer side bars, and B the inner side bars, said bars being held the desired distance apart by means of the transverse or teeth bars $a$, which teeth-bars may be located and arranged substantially as shown in Fig. 1, or they may be differently arranged, inasmuch as it is not material or important as to the exact location and arrangement of the bars $a$. It will be understood, however, that the teeth-bars $a$ should be so arranged that when they are properly connected to the side bars A and B that two rectangular frames will be produced or formed.

For the purpose hereinafter described the inner side bars B are provided with the short right-angled portions $b$, which right-angled portions provide a means for joining or hinging the two rectangular frames together, by which arrangement a hinged or joined harrow is provided. For the purpose of hinging the two rectangular frames together the short bolts $c$ are provided, which short bolts are passed through suitable apertures formed in the right-angled portions $b$. Another object and purpose of providing the short right-angled portions $b$ is to break the dividing-line between the two harrow-frames, so that some of the harrow-teeth may be located in line with the dividing-line, by which arrangement the teeth can be so arranged that there will be no space left between the two harrow-frames without teeth.

In the drawings the teeth $a'$, $a^2$, and $a^3$ are shown properly located to fill the space between the dividing-lines of the two harrow-frames. Each of the harrow teeth-bars $a$ are provided with the right-angled portions $d$, which right-angled portions are provided with the apertures $d'$ and the elongated slots $d^2$. The apertures $d'$ are for the purpose of connecting the bars $a$ to the side bars A and B by means of suitable cross-bolts, such as $d^4$. The elongated slots $d^2$ are for the purpose of limiting the rocking movements of the bars $a$ by means of bolts passed through the elongated slots and apertures $e$, formed in the side bars A and B. The adjustment of the bars $a$ is such that when the bolts $f$ come in contact with the upper ends of the elongated slots $d^2$ the bars $a$ will stand in a vertical position, thereby holding the teeth of the harrow perpendicular.

It will be understood that when the harrow proper is drawn in one direction the bars $a$ will be brought into a vertical position and held in such vertical position by means of the bolt $f$ and the elongated slots $d^2$, and when the harrow is drawn in the opposite direction the bars $a$ will be turned upon their pivotal points until the bottom or lower parts of the elongated slots strike the bolts $f$ and hold the teeth at an angle, as illustrated in Fig. 7, thereby producing what is known as a "floating" harrow.

For the purpose of holding the harrow-teeth $a'$, $a^2$, $a^3$, and $a^4$ the clamping-bolts C are provided, which clamping-bolts are screw-threaded and provided with the nuts $g$, and for the purpose of properly clamping the teeth the bolts C are provided with the inclined shoulders $g'$.

Upon the bars $a$ are located the heads D, which heads are provided with the flanges $h$, said flanges being located at an angle, and are so formed that the teeth can be placed between the flanges and the faces of the heads, as illustrated in Fig. 9, after which the bolts C are passed through the apertures $h'$ and $h^2$ and properly tightened, thereby securely clamping the teeth to the heads D and the heads D to the bars $a$, by which arrangement but one bolt is required to secure the head and teeth in proper position.

It will be understood that in order to remove the teeth or to adjust them up or down the nuts $g$ may be loosened, after which the teeth are free to be removed or adjusted.

Having fully described my invention, what I claim as new, and desire to secure by Letters Patent, is—

1. The combination of two frames consisting of the bars A, B, and $a$, the bars B, provided with the right-angled portions $b$, said portions hinged together by the short bolts $c$, the teeth-bars $a$, pivotally attached to the bars A, and B, and provided with the right-angled portions $d$, said right-angled portions provided with the elongated slots $d^2$, and the bolts $f$, substantially as and for the purpose specified.

2. In a harrow, the combination of the teeth-bars $a$, provided with apertures $h^2$, the heads D, provided with the inclined flanges $h$, and the clamping-bolt C, provided with the inclined shoulders $g'$, substantially as and for the purpose specified.

In testimony that I claim the above I have hereunto subscribed my name in the presence of two witnesses.

JOHN S. WECKMAN.

Witnesses:
J. A. JEFFERS,
F. W. BOND.